(12) United States Patent
Johnson

(10) Patent No.: US 7,690,669 B2
(45) Date of Patent: Apr. 6, 2010

(54) ADAPTER FOR A QUICK-CONNECT TRACTOR HITCH

(76) Inventor: John F. Johnson, 1427 Shanandoad Pkwy., Chesapeake, VA (US) 23320

( * ) Notice: Subject to any disclaimer, the term of this patent is extended or adjusted under 35 U.S.C. 154(b) by 245 days.

(21) Appl. No.: 11/891,286

(22) Filed: Aug. 10, 2007

(65) Prior Publication Data
US 2009/0039615 A1 Feb. 12, 2009

(51) Int. Cl.
*B60D 1/07* (2006.01)
(52) U.S. Cl. .................... 280/416.2; 172/248
(58) Field of Classification Search ............. 280/415.1, 280/416.1, 416.2, 186, 460.1, 497; 172/272, 172/439, 248; D12/162
See application file for complete search history.

(56) References Cited

U.S. PATENT DOCUMENTS

| | | | |
|---|---|---|---|
| 2,472,905 A | 6/1949 | Kass | |
| 3,421,779 A * | 1/1969 | Shelby | 280/479.1 |
| 3,856,331 A * | 12/1974 | Bogdanovich | 280/479.1 |
| 4,340,240 A | 7/1982 | Anderson | |
| 5,088,753 A | 2/1992 | Granata | |
| D341,810 S | 11/1993 | Cordia | |
| 5,267,747 A * | 12/1993 | Thorn | 280/416.2 |
| 5,690,182 A * | 11/1997 | Ward | 172/439 |
| 5,984,019 A * | 11/1999 | Hund | 172/439 |
| 6,758,285 B2 * | 7/2004 | Ollefs | 172/439 |
| 6,837,510 B1 * | 1/2005 | Karls | 280/416.1 |
| 7,040,644 B1 | 5/2006 | Adams | |
| 7,125,033 B2 * | 10/2006 | Forrister | 280/416.2 |
| 2003/0019643 A1 * | 1/2003 | Pyle | 172/439 |
| 2006/0082099 A1 * | 4/2006 | Jwanouskos | 280/416.2 |

* cited by examiner

*Primary Examiner*—Anne Marie M. Boehler
(74) *Attorney, Agent, or Firm*—William G. Sykes

(57) ABSTRACT

An adapter to facilitate attaching non-standard implements to a tractor equipped with a proprietary quick-connect hitch system. An elongated horizontal member, equipped with cylindrical end regions adapted for securing in hook regions of a quick-connect hitch system, carries a ball hitch or other similar universal hitch attachment mechanism. The novel adapter, therefore, allows attachment of implements having a ball hitch, a universal pin type hitch or other non-standard attachment mechanism to tractors equipped with quick-connect hitch systems. The novel adapter is rotatable around its major axis to allow two diverse hitches to be accommodated. For example, a ball-type hitch as well as another type connection my be selected by rotating the adapter 180° around its major axis.

15 Claims, 6 Drawing Sheets

ADAPTER FOR A QUICK-CONNECT TRACTOR HITCH

FIELD OF THE INVENTION

The invention pertains to tractor hitches, and more particularly, to an adapter for attaching implements not equipped with a quick-connect hitch to a tractor having a quick-connect hitch system.

BACKGROUND OF THE INVENTION

Tractors, large and small, are used to perform many tasks on a farm, in a yard, or in many other locations where their motive power is useful. Tractors typically perform their jobs by pulling, and sometimes powering, implements or attachments connected thereto. Indeed, the fundamental philosophy of a tractor is that one motive engine (i.e., tractor) may be used to pull many diverse implements, none of which need be self-propelled.

The first engine-powered farm tractors used steam and were introduced around 1868. These engines were built as small road locomotives and were operated by one man if the engine weighed less than 5 tons. They were used for general road haulage, in particular, in the logging industry.

Gasoline powered "traction engines" (later abbreviated "tractors") appeared around 1887 and gradually replaced the role of horses or other draft animals in pulling farm implements.

Because of the number of different implements needing to be attached to a tractor at different times, hitch systems were developed to facilitate the interchange of implements. Eventually, quick-connect hitch systems that minimized the time necessary to swap implements emerged. However, such quick-connect hitch systems were typically proprietary, meaning that implements manufactured by one vendor were not easily attached to a tractor manufactured by a different vendor. In reality, when a new tractor is purchased, a complete suite of new implements is not necessarily also purchased. This means that implements requiring a different hitch system may be left behind, creating problems for the owner of the new tractor.

DISCUSSION OF THE RELATED ART

U.S. Pat. No. 2,472,9054, for TRACTOR HITCH, issued Jun. 14, 1949, to John C. Cass, shows a swinging drawbar for a tractor hitch.

U.S. Pat. No. 4,340,240, for HITCH ADAPTER FOR A TRACTOR, issued Jul. 20, 1982 to Ernest L. Anderson, shows a three-point hitch adapter for a tractor. The Anderson hitch may carry a trailer hitch ball.

U.S. Design Pat. No. 341,810 for THREE POINT TOW BAR HITCH, issued Nov. 30, 1993 to Clifford H. Cordia, shows a tractor hitch having a trailer hitch ball.

U.S. Pat. No. 5,088,753, for THREE-POINT HITCH, WHICH IS CONVERTIBLE TO A BALL HITCH, issued Feb. 18, 1992 to Clarence Granata, teaches another tractor hitch adapted to support a trailer hitch ball.

U.S. Pat. No. 7,040,644, for HYDRAULIC THREE-POINT HITCH, issued May 9, 2006 to Charles M. Adams, discloses another three point hitch tractor for supporting a trailer hitch ball.

U.S. Pat. No. 7,048,070, for QUICK COUPLER ASSEMBLY WITH DUAL HOOK MEMBERS, issued May 23, 2006 to Wayne William Powell, shows a quick-connect system for attaching an implement to a tractor or the like.

None of these patents, taken singly or in combination, are seen to anticipate or suggest the hitch adapter of the present invention.

It would, therefore, be desirable to provide an adapter allowing attachment of non-standard implements to a tractor having a proprietary quick-connect hitch system.

SUMMARY OF THE INVENTION

In accordance with the present invention, there is provided an adapter to facilitate attaching non-standard implements to a tractor equipped with a proprietary quick-connect hitch system. An elongated horizontal member is equipped with cylindrical end regions adapted for securing within the hook regions of a quick-connect hitch system. The elongated member carries a ball hitch or other similar attachment device. The novel adapter, therefore, allows attachment of implements having a ball hitch or other such attachment mechanism to tractors equipped only with a quick-connect hitch system. The novel adapter is rotatable around its major axis to allow two diverse hitch mechanisms to be accommodated. For example, a ball-type hitch, a universal pin type hitch, as well as another type of hitch connector, may be selected by rotating the adapter 180° around its major axis.

It is, therefore, an object of the invention to provide an adapter apparatus retainable by a quick-connect hitch system of a tractor.

It is another object of the invention to provide an adapter apparatus bearing a ball hitch, a universal pin type hitch or other such hitch mechanism.

It is an additional object of the invention to provide an adapter apparatus that may quickly be attached to, or removed from, a tractor.

It is a further object of the invention to provide an adapter apparatus that may be attached to the quick-connect hitch system in at least two orientations allowing at least two different types of hitch connections to be provided.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 1b is a detailed, perspective, pictorial view of a portion of the quick-connect hitch system of FIG. 1a;

FIGS. 3a and 3b are left-hand and right-hand perspective, pictorial views, respectively, of the adapter mechanism of the present invention connected to the hitch of FIG. 1a; and FIG. 3c is a left-hand perspective, pictorial view of the adapter mechanism of the present invention installed in an inverted (i.e., rotated) orientation with respect to the orientation of FIG. 3a.

DETAILED DESCRIPTION OF THE PREFERRED EMBODIMENT

The present invention provides a hitch adapter, allowing attachment of non-standard implements to a standard quick-connect hitch installed on a tractor.

Quick-connect hitch mechanisms are well known to those of skill in the art. Typically, such mechanisms are proprietary, thereby limiting the range of attachable implements to those provided by the vendor of the particular quick-connect hitch mechanism. Unfortunately, the owner of a tractor equipped with such a quick-connect hitch system cannot easily attach implements from other vendors, homemade implements, or even implements from a previous generation of implements from the vendor of the quick-connect hitch mechanism.

One such quick-connect hitch mechanism is provided by Deere & Company of Moline Ill., under the trade name Quick-Attach iMatch™. While the Deere & Company Quick-Attach iMatch™ system is chosen for purposes of disclosure, it will be recognized by those of skill in the art that other comparable quick-connect systems exist, and that the principles of the present invention may readily be applied thereto. Therefore, the invention is not considered limited to any particular quick-connect hitch system. Rather, the invention covers any and all such quick-connect hitch systems.

The Deere & Company Quick-Attach iMatch™ system converts three-point hitch systems to fixed hooks with attaching points. This allows a tractor operator to back his or her tractor up to an implement, connect a power takeoff (PTO) shaft (when required), and move off with the implement attached. This allows for quickly swapping implements. However, as previously mentioned, many implements are not compatible with quick-connect hitch systems. The novel adapter of the present invention overcomes this limitation by being compatible with both quick-connect hitch systems and numerous non-standard implements that a user may wish to attach to a tractor.

Figure 1A:
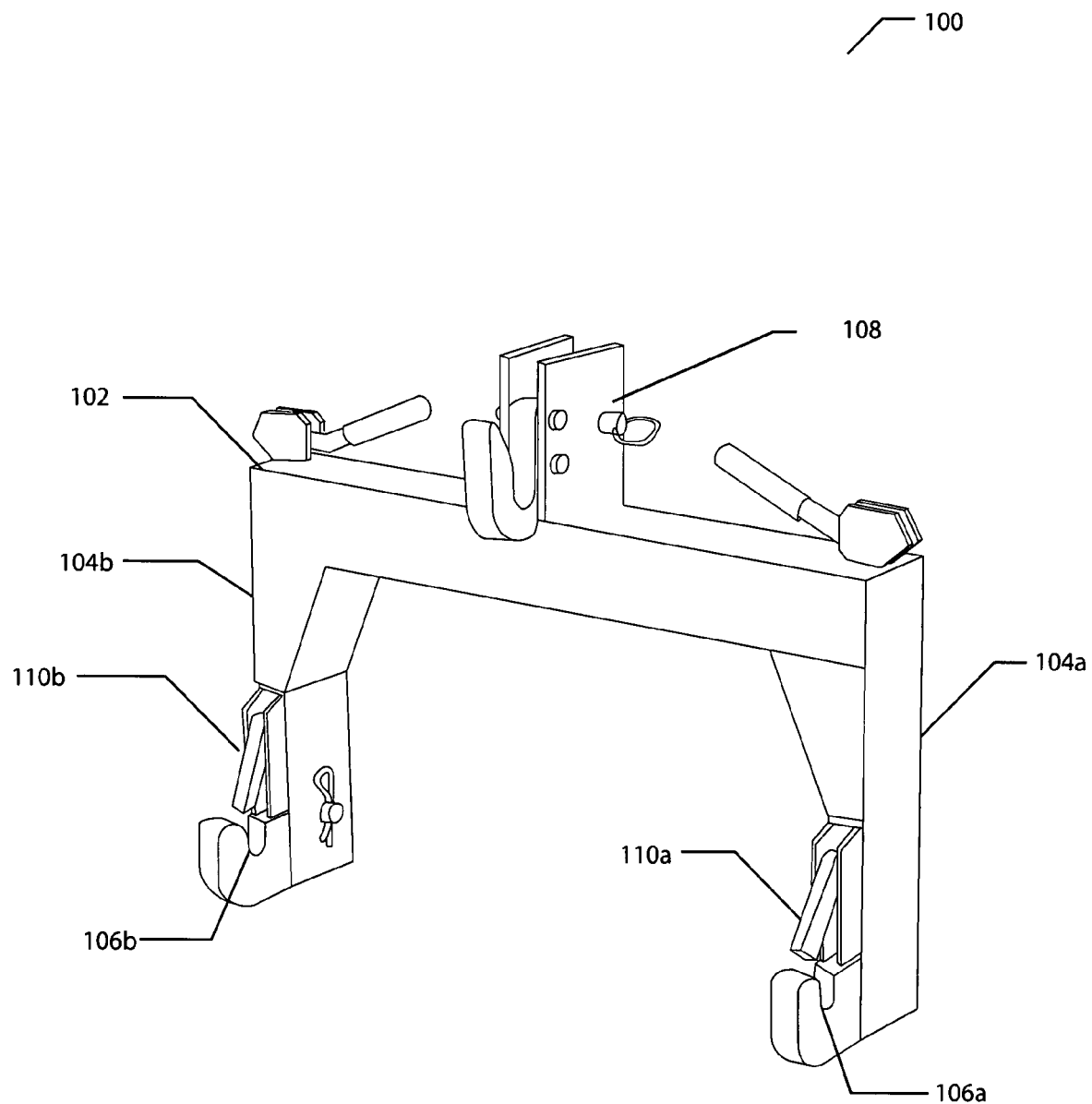
FIG. 1a is a perspective, pictorial view of a quick-connect hitch system (or "hitch") of the prior art.
Figure 1B:
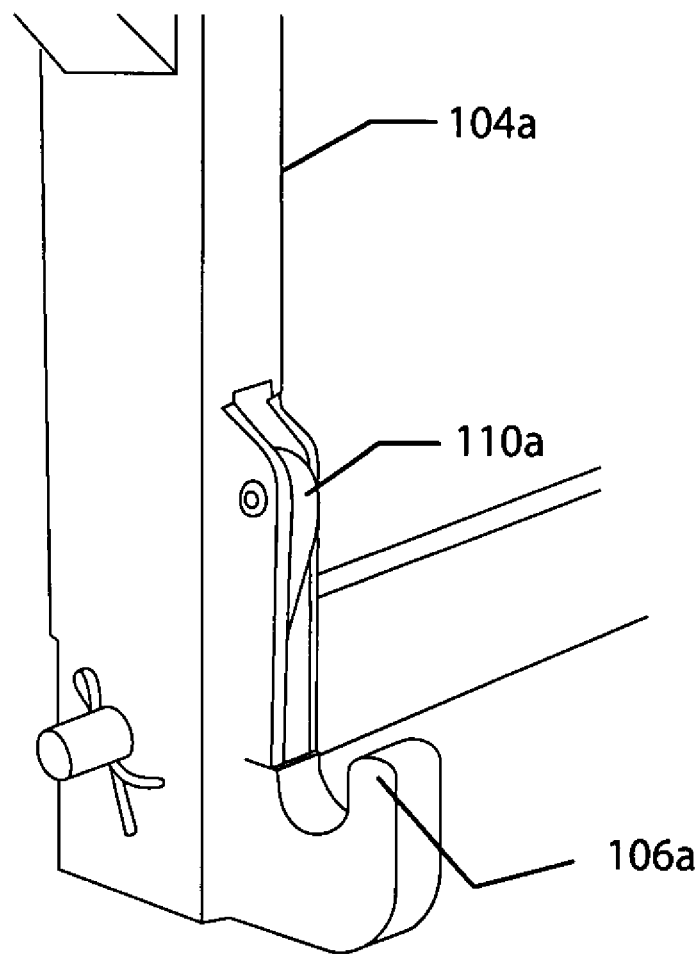

Referring first to FIG. 1a, there is shown a perspective, schematic view of a quick-connect hitch system of the prior art, generally at reference number 100. Hitch system 100 is utilized at the rear portion of a conventional tractor, not shown. A horizontal cross member 102 supports downward extending side members 104a and 104b, respectively disposed at the proximal and distal ends thereof. Hooks 106a, 106b are disposed at the lower ends of downward extending side members 104a, 104b, respectively. Referring now also to FIG. 1b, there is shown a detailed view of a portion of the hitch of FIG. 1a.

Hooks 106a, 106b are adapted to receive a support member of an implement, not shown, being attached to hitch 100. An upper hook 108 may be attached centrally on horizontal member 102. The combination of hooks 106a, 106b, and 108 allow a three-point attachment of an implement.

Keepers 110a, 110b pivotally attached to downward-extending members 104a, 104b, respectively, may be provided to retain a support member, not shown, within hooks 106a, 106b.

Figure 2:
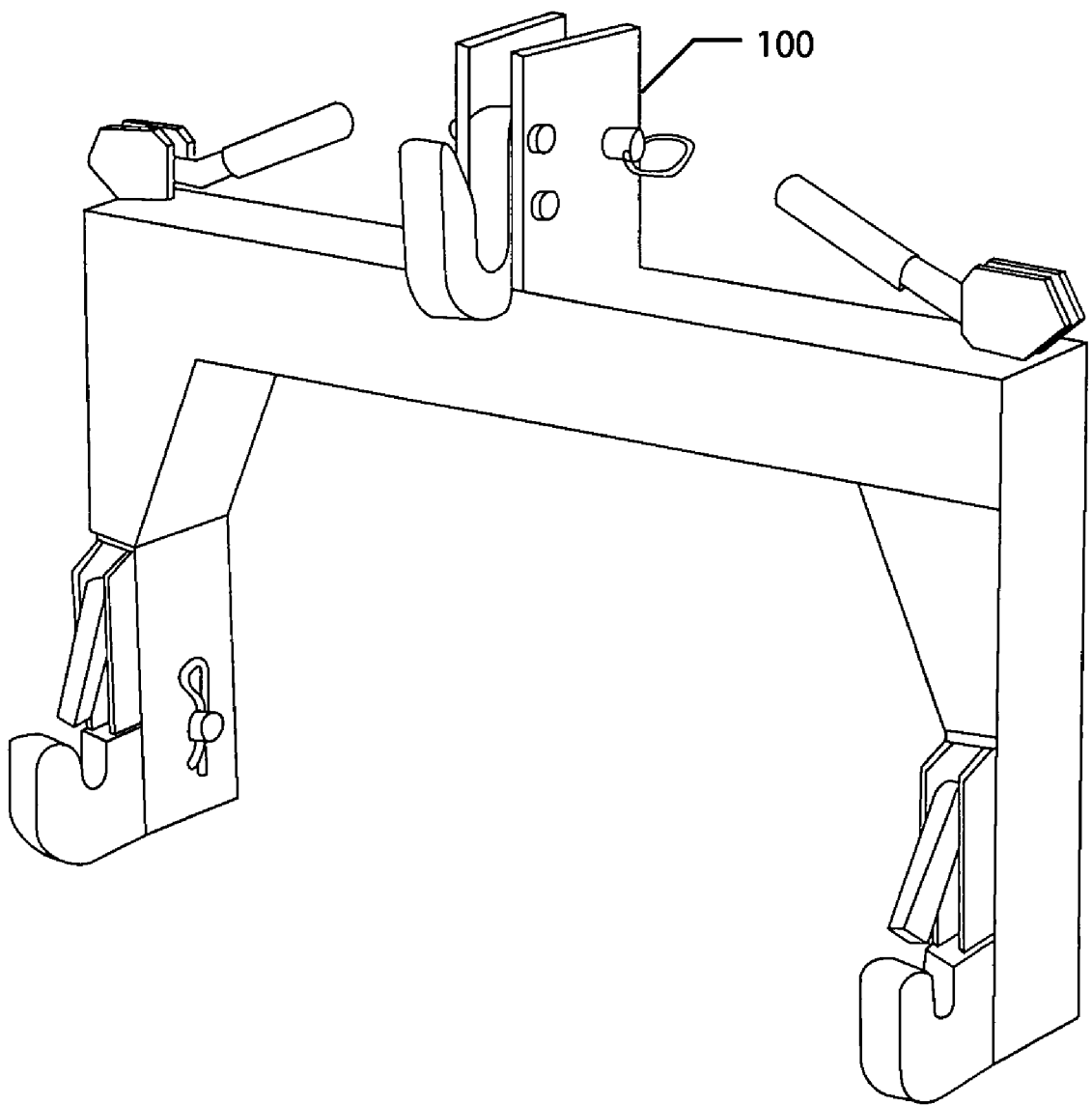
FIG. 2 is a perspective, pictorial view of the hitch of FIG. 1a with an implement connected thereto.

Referring now also to FIG. 2, there is shown a perspective, pictorial view showing hitch 100 retaining an implement using hooks 106a, 106b, and 108. The implement, not specifically identified, is equipped with a compatible hitch apparatus for attachment to hitch 100.

Figure 3A:
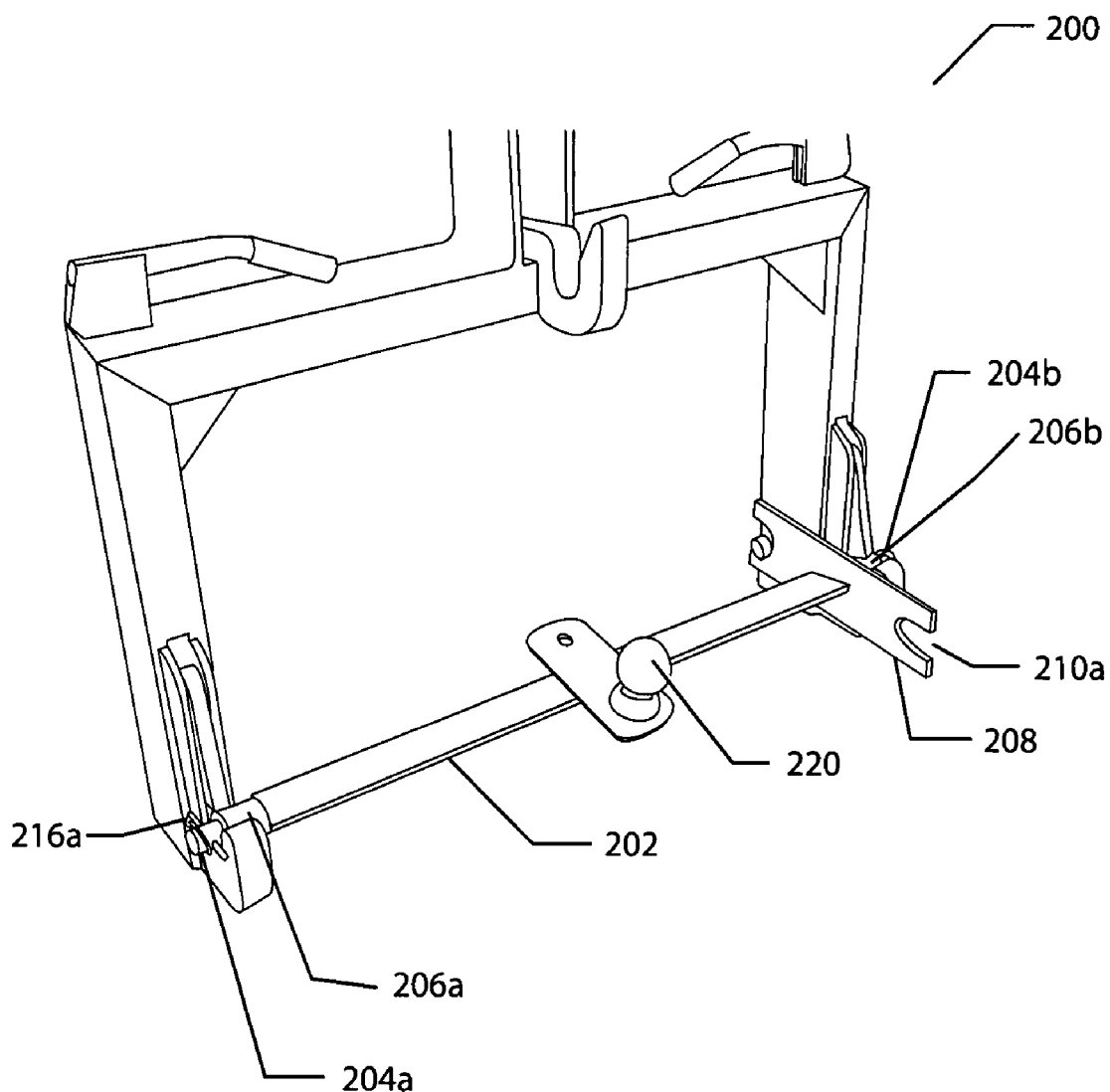
Figure 3B:
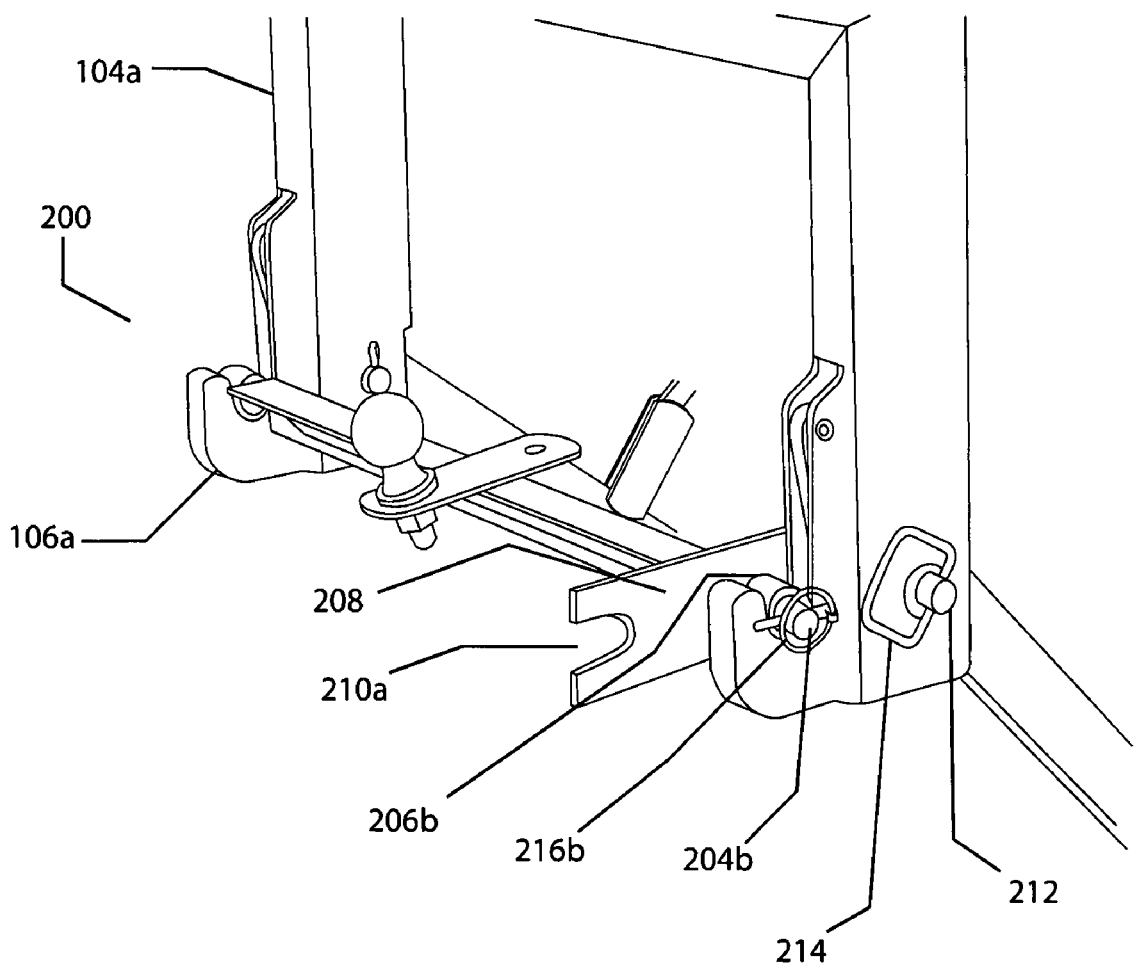

Referring now to FIGS. 3a and 3b, there is shown left- and right-side pictorial perspective views, respectively, of the hitch adapter assembly of the present invention, generally at reference number 200. A longitudinal, elongated horizontal member 202 has cylindrical end sections 204a, 204b disposed at proximal and distal ends thereof, respectively. Elongated horizontal member 202 is shown as a angle iron shaped bar having a rectangular cross-section for purposes of disclosure. However, it will be recognized that elongated horizontal member 202 may have any suitable cross-sectional shape. Consequently, the invention is not limited to any particular shape or form factor for elongated horizontal member 202. Rather, the invention includes elongated horizontal members of any cross-sectional shape or form factor.

Bushings 206a, 206b are disposed on respective ones of cylindrical end sections 204a, 204b. Bushings 206a, 206a have outside diameters adapted to fit snugly within hooks 206a, 206b of hitch 100.

An anti-rotation plate 208 is disposed substantially perpendicularly to, and rigidly affixed to, elongated horizontal member 202, proximate a distal end thereof. Anti-rotation plate 208 has arcuate openings 210a, 210b disposed at its proximal and distal ends, respectively. Arcuate opening 210b engages a pin 212 placed in a throughbore, not specifically identified, in downward-extending side member 104a. Pin 212 is retained in the throughbore by a retaining clip 214. Suitable retaining pins are believed to be known to those of skill in the art and are not further described herein. It will be recognized that any suitable retaining clip or other similar structure may be used to retain pin 212.

It will also be recognized that non-arcuate openings may also be used to replace arcuate openings 210a, 210b. For example, square or rectangular openings may be used to engage pin 212.

Respective cylindrical ends 204a, 204b are retained by additional retaining clips 216a, 216b, respectively. Retaining clips suitable for use are believed to be well known to those of skill in the art and are not further described herein.

A hitch mounting plate 218 is disposed on horizontal member 202 proximate a central region thereof. Mounting plate 218 is disposed substantially perpendicularly to horizontal member 202, and has a major axis bisected by a major axis of elongated horizontal member 202. Hitch mounting plate 218 is adapted to receive ball hitch 220. Ball hitch 220 is intended to be representative of any hitch mechanism useful for attaching to a tractor any implement without a quick-connect hitch arrangement.

Figure 3C:
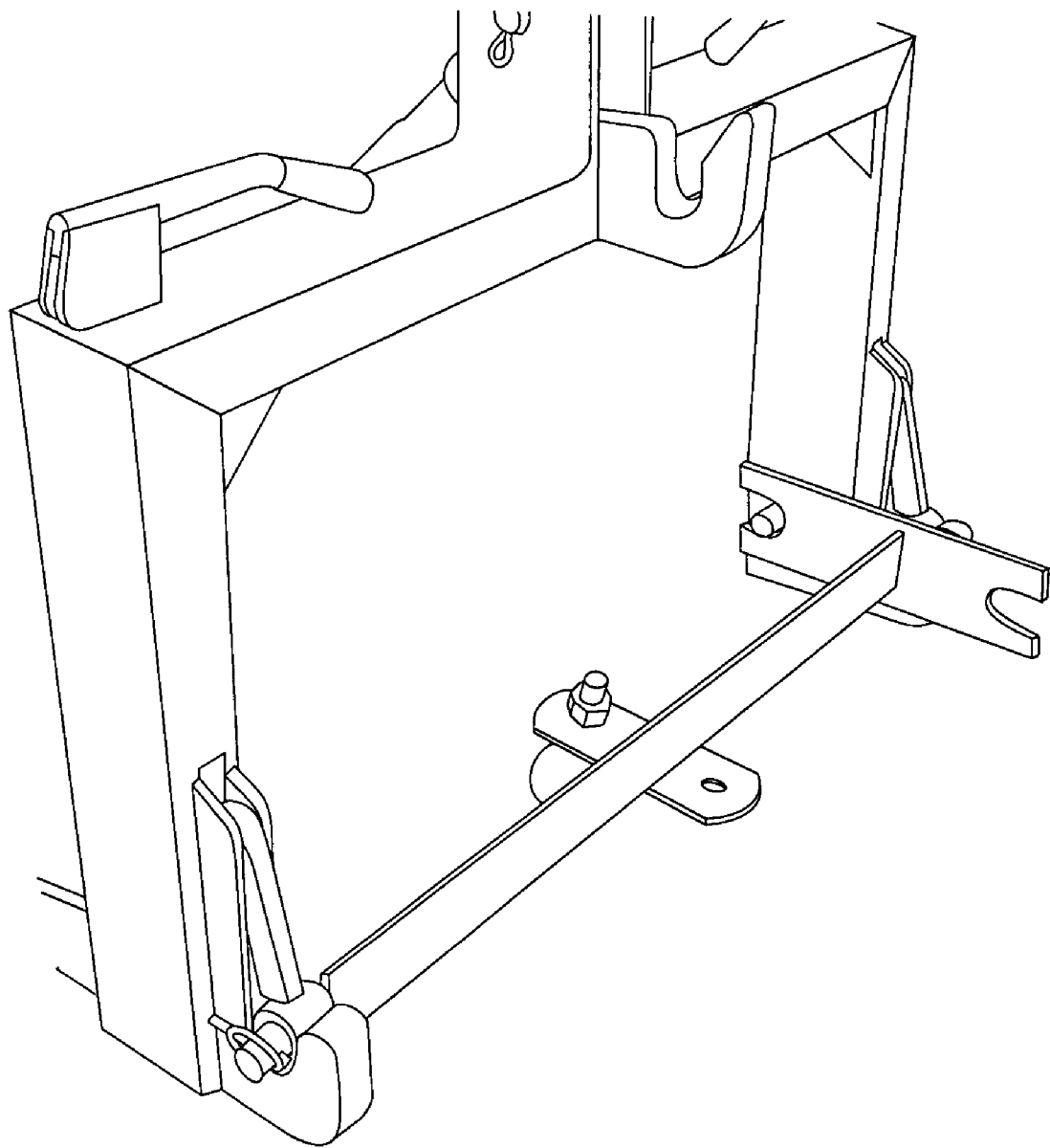

As may readily be seen, the novel adapter assembly 200 of the invention is symmetrical. Therefore, adapter assembly 200 may be attached to hitch 100 in either of two orientations. Referring now to FIG. 3c, there is shown a left side, perspective, pictorial view of adapter assembly 200 attached to hitch 100 in an inverted position relative to its attachment as shown in FIGS. 1a and 1b. Such reversibility allows two diverse hitches, for example two different size ball hitches, or a ball hitch and a universal pin type hitch to be attached at opposite ends and on opposing surfaces of hitch mounting plate 218. Merely reversing adapter assembly 200 allows selecting between the two hitch styles.

In operation, adapter assembly 200 is seated in hooks 106a, 106b, and retained therein by keepers 110 (FIG. 1b). Horizontal member 202 is rotated until a selected one of arcuate openings 110a, 110b is properly aligned with a throughbore in hitch assembly 100. Pin 212, in combination with retaining clip 214, may then be used to secure anti-rotation plate 208 to downward-extending side member 104b. Retaining clips 216a, 216b may then be inserted to prevent side-to-side movement of horizontal member 202.

It will be recognized that anti-rotation plate 208 may be placed proximate either the distal or the proximal end of elongated horizontal member 202.

Different diameter bushings 206a, 206b may be provided to allow adapter assembly 200 to function properly with multiple quick-connect hitch systems.

It will also be recognized that in alternate embodiments, bushings 206a, 206b may be eliminated. In such embodiments, the outside diameter of cylindrical ends 204a, 204b must have an outside diameter compatible with hooks 106a, 106b with which the resultant adapter assembly 200 is intended to operate.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A reversible adapter for use with a quickconnect hitch system, comprising:
   a) an elongated horizontal member having a major axis, and proximal and distal end regions, each of said proximal and distal end regions having a cylindrical cross-section, said proximal and said distal end region each having an outside diameter adapted to fit within a hook region of said quick-connect hitch system;
   b) a substantially rectangular, planar anti-rotation plate having a proximal edge and a distal edge, said anti-rotation plate being rigidly affixed to said elongated horizontal member proximate at least one of said proximal and said distal end regions thereof, said anti-rotation plate having a major axis disposed substantially horizontally and orthogonal to said horizontal member and said anti-rotation plate comprising a notch disposed in at least one of said proximal edge and said distal edge; and
   c) a single hitch mounting plate rigidly affixed to said elongated horizontal member, said single hitch mounting plate comprising a major axis, said single hitch mounting plate being positioned relative to said elongated horizontal member such that said major axis is bisected by said major axis of said elongated horizontal member, said major axis of the hitch mounting plate and said major axis of said elongated horizontal member being disposed in parallel planes, said single mounting plate having means for interchangeably receiving a hitch assembly proximate either a proximal or a distal end thereof.

2. The reversible adapter for use with a quick-connect hitch as recited in claim 1, wherein said elongated horizontal member has a rectangular cross-section in a region disposed between said proximal end region and said distal end region.

3. The reversible adapter for use with a quickconnect hitch as recited in claim 1, wherein said notch disposed in at least one of said proximal edge and said distal edge of said anti-rotation plate comprises an arcuate portion.

4. The reversible adapter for use with a quickconnect hitch as recited in claim 1, further comprising:
   d) a bushing disposed between at least one of said end regions having a cylindrical cross-section and said hook regions of said quick-connect hitch system.

5. The reversible adapter for use with a quick-connect hitch as recited in claim 1, wherein said notch disposed in a least one of said proximal edge and said distal edge of said anti-rotation plate is adapted for engaging interaction with a pin disposed in a vertical member of said quick-connect hitch.

6. The reversible adapter for use with a quickconnect hitch as recited in claim 1, further comprising:
   d) a retaining clip disposed proximate at least one of said proximal and said distal end of said elongated horizontal member.

7. The adapter for use with a quick-connect hitch as recited in claim 1, further comprising:
   d) a retaining clip for removable attachment to said pin proximate a distal end thereof.

8. A method of adapting an implement for attachment to a quickconnect hitch system, the steps comprising:
   a) providing a reversible quickconnect hitch adapter comprising: an elongated horizontal member, a substantially rectangular, planar anti-rotational plate having a proximal edge and a distal edge, said anti-rotation plate being rigidly affixed to said elongated horizontal member proximate at least one of said proximal and said distal end regions thereof, said anti-rotational plate having a major axis disposed substantially horizontally and orthogonal to said horizontal member and said anti-rotation plate comprising a notch disposed in at least one of said proximal edge and said distal edge, a single hitch mounting plate rigidly affixed to said elongated horizontal member, said single hitch mounting plate comprising a major axis, said single hitch mounting plate being positioned relative to said elongated horizontal member such that said major axis is bisected by said major axis of said elongated horizontal member, said major axis of said hitch mounting plate and said major axis of said elongated horizontal member being disposed in parallel planes, said single mounting plate having means for interchangeably receiving a hitch assembly proximate either a proximal or a distal end thereof, and at least one hitch component compatible with said implement to be attached to said quickconnect hitch system;
   b) connecting said quick-connect hitch adapter to said quick-connect hitch system; and
   c) connecting said implement to said hitch component compatible therewith.

9. The method of adapting an implement as recited in claim 8, wherein said elongated member comprises a cylindrical proximal and distal end region, and wherein said connecting step (b) comprises the sub-step of placing said cylindrical proximal and distal end regions into hook portions of said quick-connect hitch system.

10. The method of adapting an implement as recited in claim 9, wherein said connecting step (b) further comprises the sub-step of attaching said anti-rotation plate to a member of said quick-connect hitch system.

11. The method of adapting an implement as recited in claim 10, wherein said providing step (a) comprises providing a quickconnect adapter comprising at least two different hitch components, each compatible with different implements, and wherein said elongated horizontal member is rotatable about a major axis thereof.

12. The method of adapting an implement as recited in claim 10, wherein said connecting step (b) further comprises the sub-step of attaching said anti-rotation plate to a member of said quick-connect hitch system by placing a pin through said member and retaining said pin using a retaining clip.

13. The method of adapting an implement as recited in claim 11, the steps further comprising:
   d) prior to placing said cylindrical proximal and distal end regions into said hook portions, placing a bushing over each of said proximal and distal end regions.

14. The method of adapting an implement as recited in claim 9, wherein said connecting step (b) further comprises placing a retaining clip proximate at least one of said distal and said proximal end regions of said elongated horizontal member.

15. The method of adapting an implement as recited in claim 8, the steps further comprising:
   d) disconnecting said quick-connect hitch adapter from said quick-connect hitch system;
   e) rotating said quick-connect hitch adapter 180° around a major axis thereof; and
   f) reconnecting said quick-connect hitch adapter to said quick-connect hitch system.

* * * * *